F. P. Davenport,
Cultivator.
No. 112,130. Patented Feb. 28, 1871.
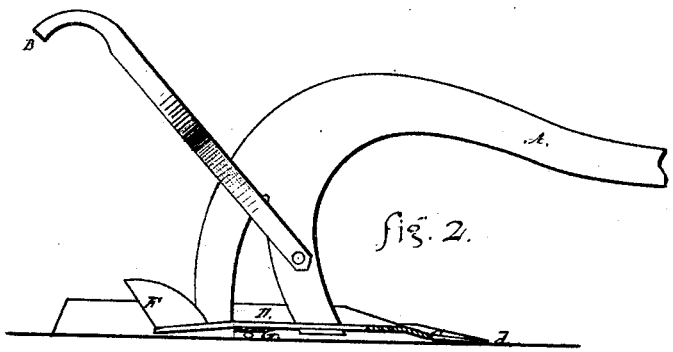
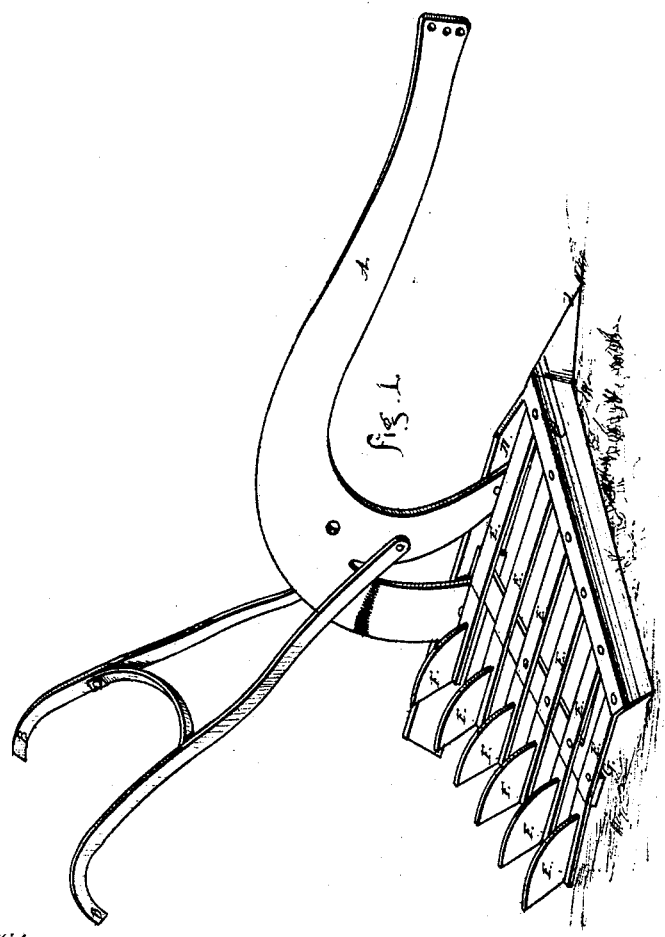
Witnesses:
O. H. Brewer
Samuel Jacob Wallace
Inventor:
Frank Phillip Davenport

UNITED STATES PATENT OFFICE.

FRANK P. DEVENPORT, OF CARTHAGE, ILLINOIS, ASSIGNOR TO HIMSELF, JOHON W. CHERRY, AND THOMAS LOGAN.

IMPROVEMENT IN MEADOW-CULTIVATORS.

Specification forming part of Letters Patent No. 112,130, dated February 28, 1871.

*To all whom it may concern:*

Be it known that I, F. P. DEVENPORT, of Carthage, Hancock county, Illinois, have invented a new and useful Meadow-Cultivator or Underground Plow, of which I declare the following is a full, clear, and exact description, having reference to the accompanying drawing, and the letters of reference marked thereon, in which—

Figure 1 is a perspective view of my improved cultivator.

The object of my invention is to form a suitable plow for cultivating meadows without turning over the sod, and it is made and used substantially as shown and set forth.

A is the draft-beam, B B the handles, and C the cutting-share, all of suitable form, with landside-bar D.

Backward from the cutter-share C extend bars E E E, of more or less number—say six. These, with the cutter C, rise two or three inches, to carry the sod up a little. On the back ends of these bars E E E are raised fin-shaped cutters, which reach up into the sod and cut and tear it, so as to leave it with a more loose bottom after the passage. The sod, after passing over these, falls again into its place. By preference I would turn the point of draft into such a relation to the plow that the team would walk as little as possible on the plowed sod. The bars E E E, in their back part, are bolted to a cross part, G, from the landside-bar D, to make them solid, and may each be separately removed for sharpening the cutting-fins F F F on them. If preferred, the share may extend either to one side or to both of the upright part H of the beam. The fins F F F are not designed to cut entirely through the sod.

The design of the implement is to be run through meadows back and forth at such a depth that the cutters F F F, which may be made of any suitable form, will pass just under the top of the sod and cut it up somewhat, which, with the bending of the sod in a curve over the plow, is intended to give it a very useful cultivation by making it loose underneath, so that spring and summer showers will readily penetrate, at the same time that deep-growing perennial weeds, which sometimes infest meadows, will be cut off.

The cutters F F F are made to extend upward from the parts they rest on and rise backward, with the upper and forward edge sharpened for cutting. There are several modified forms of this part which may be employed to cut, tear, or scrape, if it is desired to use such, but not requisite to be described now, all being arranged as shown in drawing.

What I claim is—

The combination of the bars E E E, cutting-fins F F F with the share C and the landside-bar D, beam and handles of the cultivator, operating substantially as set forth.

FRANK PHILLIP DEVENPORT.

Witnesses:
SAMUEL JACOB WALLACE,
O. H. BREWER.